May 1, 1928.
F. B. FALKINS
1,668,061
UNIVERSAL WOODWORKING MACHINE
Filed Aug. 11, 1926
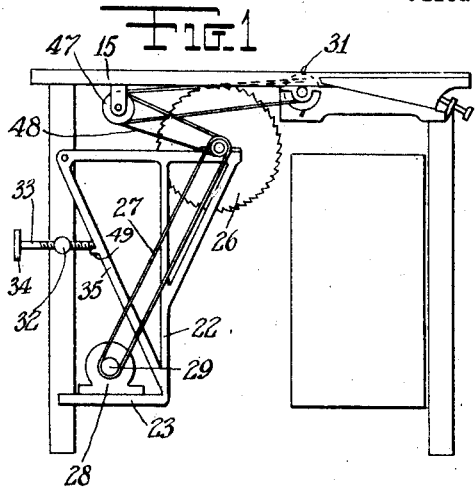
INVENTOR
F.B.Falkins
BY
ATTORNEY Patented May 1, 1928.

1,668,061

UNITED STATES PATENT OFFICE.

FRED B. FALKINS, OF WINFIELD, NEW YORK.

UNIVERSAL WOODWORKING MACHINE.

Application filed August 11, 1926. Serial No. 128,527.

The main object of this invention is to provide a woodworking machine upon which all operations on wood may be performed. With the usual type of machine of this character, it is possible to use all or any of the spindles at the same time. This arrangement permits the entering of an element of danger to the operator, inasmuch as when he is using one part of the machine, another part may cause injury to him. Another object of this invention is to eliminate this danger by providing a machine having its operating members so organized that when one saw or other member is in operation, the remaining parts cannot be rotated.

The above and other objects will become apparent in the description below, in which characters of reference refer to like-named parts in the drawing.

Referring briefly to the drawing, Figure 1 is a front elevational view of one side of the woodworking machine, showing one of the saws in inactive position beneath the table.

Figure 2 is a view similar to Figure 1, showing the same member in active position.

Figure 3 is a top plan view of the woodworking machine with the table top removed.

Figure 4 is a view similar to Figure 3 with the table top in place.

Referring in detail to the drawing, the numerals 10, 11, 12, 13, and 14, indicate the legs of a frame which support a table top 15. Between the adjacent sides of the legs 10 and 13, lugs 16 and 17 are mounted. These lugs serve as anchoring members for pivot studs 18 which are mounted on the sides of a pivoted frame 19. The frame consists of a pair of arms 20 and 21 which have a vertical downwardly extending wall 22 integral therewith. Projecting at right angles to this wall 22, a platform 23 is provided. The arms support a shaft 24 which is journalled in suitable blocks 25 and at one end has a rip saw 26 secured thereto. A pulley is mounted on said shaft 24 and a belt 27 is trained about this pulley. The platform 23 is used as a support for a motor 28 which is firmly secured in place and its pulley 29 has the opposite end of the belt 27 trained about it. At the extreme end of the shaft 24 opposite to the rip saw 26, an additional pulley 46 is mounted on said shaft. On one side of the machine a planer roll 29 is mounted. A stud 32 is pivoted between the legs 10 and 13 and has a threaded bolt 33 passing diametrically therethru. This bolt is provided with a fluted head 34 and its opposite end engages an inclined wall 35 in the acute-angled recess formed by the intersection of the inclined wall and an integral tongue 49 on said wall, and thru such contact urges the frame from the position shown in Figure 1 to that shown in Figure 2 when the bolt 33 is rotated. A second pivoted frame 36 of identical, but smaller dimensions, to that previously mentioned is anchored between angle irons 37 and 38 which are mounted between the legs 11 and 12 and serves as a carriage for a second shaft 39 which has a cross-cut saw 40 at one end and a drill spindle 41 at the opposite end. Said shaft 39 is driven thru a belt 42 by a motor 43, which is mounted on a platform similar to that indicated by the numeral 23. Adjacent the pulley about which the belt 42 is trained on the shaft, an additional pulley is mounted. A belt 44 is trained about this pulley and extends to the pulley of a shaper head 45.

A pulley 46 is mounted on the shaft 24 and an additional idler pulley 47 is mounted between brackets on the inside of the table top 15. The idler pulley 47 and pulley 46 are connected by a belt 48, which belt becomes slack when the frame carrying the saw 26 is lifted to the raised position where a portion of its upper half extends above the table top 15. The idler pulley is rigidly attached to a shaft and the belt 48 is used to rotate the planer roll 29.

This invention aims to introduce a pivoted frame which carries a circular cross-cut and rip saw, both of these saws being mounted on individual frames. The invention uses a pair of motors which drives various woodworking units. One of the frame members supports the shaft 24 which has a saw 26 mounted at one of its ends. This saw may be normally positioned partly above or entirely below the surface of the table top. The motor 28, which drives this saw 26, is mounted directly on the pivoted carriage and is always in a position to drive the shaft 24, as the distance between the shaft 24 and the motor remains fixed and constant. It will be noted that the idler pulley 47, which is connected to a pulley 46 thru a belt 48, drives the planer roll 29 only when the belt 48 is taut, this condition being only possible when the saw 26 is positioned beneath the table top 15, as illustrated in Figure 1. When a portion of the saw 26 has been lifted above the table top by manipulation of the stud 33, the belt 48 becomes slack and will not rotate the planer roll thru the medium of the belt 30. Thus it will be seen that only the saw or the planer roll may be individually and selectively rotated and not at the same time.

It is to be noted that certain changes in form and construction may be made without departing from the spirit and scope of the invention.

I claim:—

1. In a woodworking machine having a table top, a frame pivotally mounted under said top, a circular saw rotatably mounted near the top of said frame, a motor mounted at the bottom of said frame, means connecting said saw and motor whereby the motor drives the saw, and means for swinging said frame upward comprising a stud pivoted beneath said top, a threaded bolt passing through said stud at right angles thereto, a tongue integral with said frame, the tip of said bolt engaging said frame at the point of intersection of said tongue with the side of said frame, and a head on said bolt rotating the latter.

2. In a woodworking machine having a table top, a frame pivotally mounted under said top, a circular saw rotatably mounted near the top of said frame, a motor mounted on said frame beneath said saw, means connecting said saw and motor whereby the motor drives the saw, and means for swinging said frame upward comprising a stud pivoted beneath said top, a threaded bolt passing through said stud at right angles thereto, a tongue integral with said frame at one side of the latter and projecting at an angle therefrom to form an acute-angled recess, the tip of said bolt engaging said frame in said recess, and a head on said bolt for rotating the latter.

In testimony whereof I affix my signature.

FRED B. FALKINS.